Dec. 23, 1958     C. F. RODRIGUEZ, JR     2,866,146
AUTOPILOT STEERING SYSTEM

Filed Sept. 29, 1950     4 Sheets-Sheet 1

INVENTOR.
Charles F. Rodriguez, Jr
BY
D. Gordon Angus
ATTORNEY

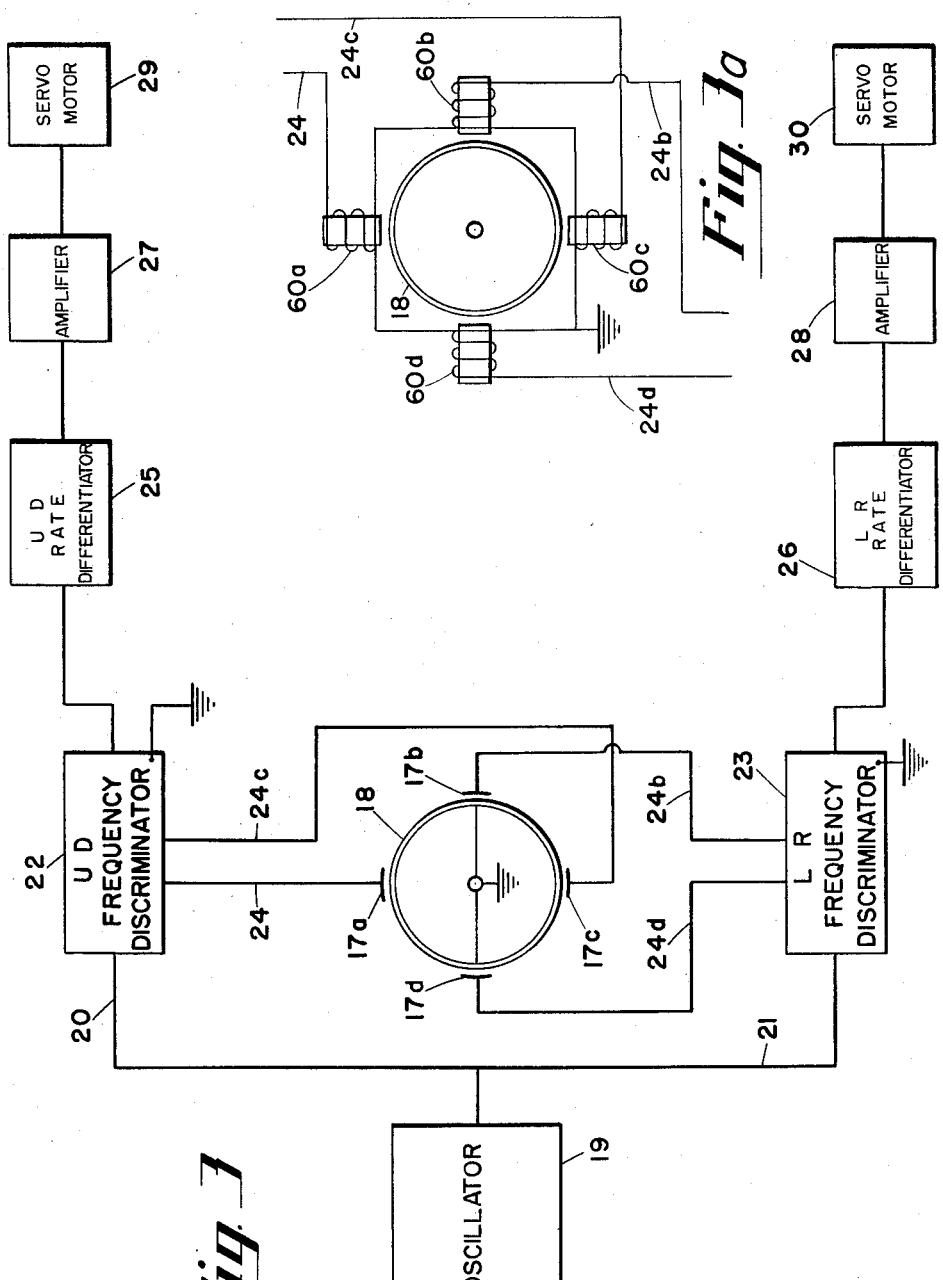

Dec. 23, 1958  C. F. RODRIGUEZ, JR  2,866,146
AUTOPILOT STEERING SYSTEM
Filed Sept. 29, 1950  4 Sheets-Sheet 4

INVENTOR.
Charles F. Rodriguez, Jr.
BY
D. Gordon Angus
ATTORNEY

United States Patent Office 2,866,146
Patented Dec. 23, 1958

2,866,146

AUTOPILOT STEERING SYSTEM

Charles F. Rodriguez, Jr., Los Angeles, Calif., assignor, by mesne assignments, to Aerojet-General Corporation, Azusa, Calif.

Application September 29, 1950, Serial No. 187,613

4 Claims. (Cl. 318—489)

This invention relates to automatic steering systems, and more particularly to such systems responsive to devices which detect the direction of an object.

Devices are known for causing a vehicle such as an aircraft or missile to travel toward an object or target. Such devices have been called homing systems. In some such arrangements, wave energy radiated from or reflected from the object or target is received at a detector or seeker on the vehicle, thereby causing a directional element of the seeker to point toward the target.

The present invention relates to the detection of the movement of such a directional element and of means enabling such detection to be utilized for steering the vehicle or aircraft or missile in response thereto. Ordinarily it will be desired that the steering system shall direct the craft toward the object or target in response to the pointing of the directional element of the seeker although there may be instances where a different steering course may be desired in response to the directional device.

The present invention is especially applicable for use with the seeker covered in the copending application of William E. Osborne, entitled Tracking System, executed August 17, 1950, Serial No. 180,610, filed August 21, 1950, assigned to the same assignee as the present application; although it should be understood that the present system is not limited to use with the particular seeker of said copending application.

In the said copending application, there is embodied a gyroscope, and the system comprises means for precessing the gyroscope in a direction in response to radiant energy from the target, so that the directional axis of the gyroscope can be automatically set in relation to the target.

In accordance with the present invention, electrical elements are associated with the gyro or pointing device of the seeker in such a manner that the electrical values are varied in accordance with change of precession of the gyro.

A feature of the arrangement is that these electrical elements are connected into the frequency responsive circuits of frequency discriminators upon which are impressed the oscillations from an oscillator. Since the outputs of the discriminators are dependent upon the electrical values in the frequency responsive circuits, it follows that movement of the gyro or indicator will be evidenced at the discriminator output by a corresponding output voltage. Such output voltages from the discriminators are then utilized to drive suitable servo or other mechanisms for operating the steering equipment of the vehicle or missile or aircraft.

In order to produce a desired steering of the vessel to send it in a given direction relative to the target, such as the usual homing direction toward the target, it is desired that the servo mechanism or such other operating mechanism as is used to steer or elevate the craft, be responsive to changes of direction of the seeker or indicator, rather than merely its direction alone. For this purpose, it is desired to carry the discriminator output voltages through suitable circuits for producing a response proportional to the rate of change of direction. A well known circuit for doing this is a differentiating circuit.

The foregoing and other features of the invention will be better understood from the following detailed description and the accompanying drawings, of which:

Fig. 3 shows an electrical system in line and block diagram form responsive to the precession of the gyroscope, in accordance with this invention; and Fig. 3a shows a possible modification therefor;

Fig. 4 shows in detail an electrical system according to Fig. 3;

Figure 1:
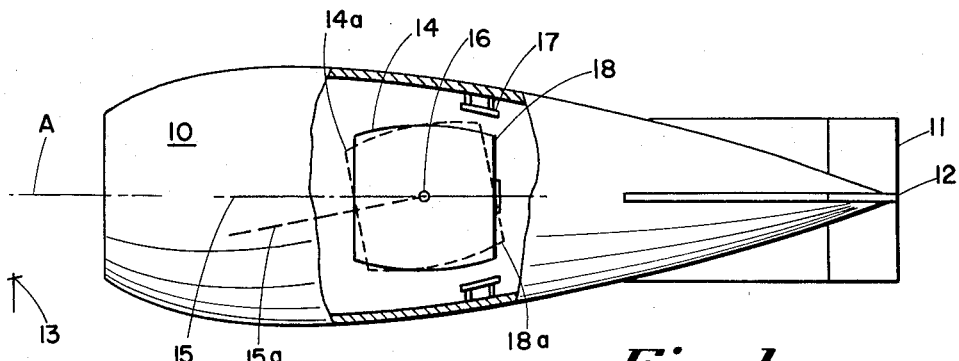
Fig. 1 shows a craft containing a gyroscope subject to precession in any direction and provided with electrical pickup elements variable with the precession, in accordance with this invention.
Figure 2:
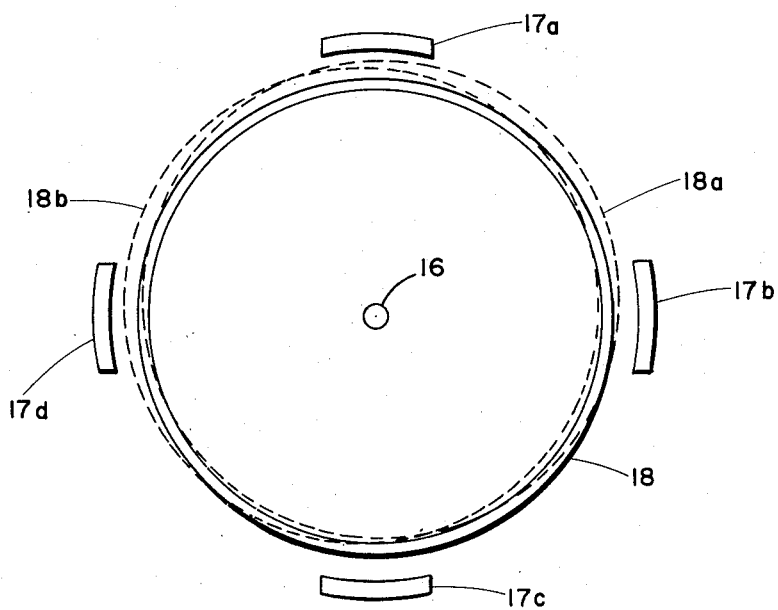
Fig. 2 is an end view of the gyro of Fig. 1.
Figure 1:
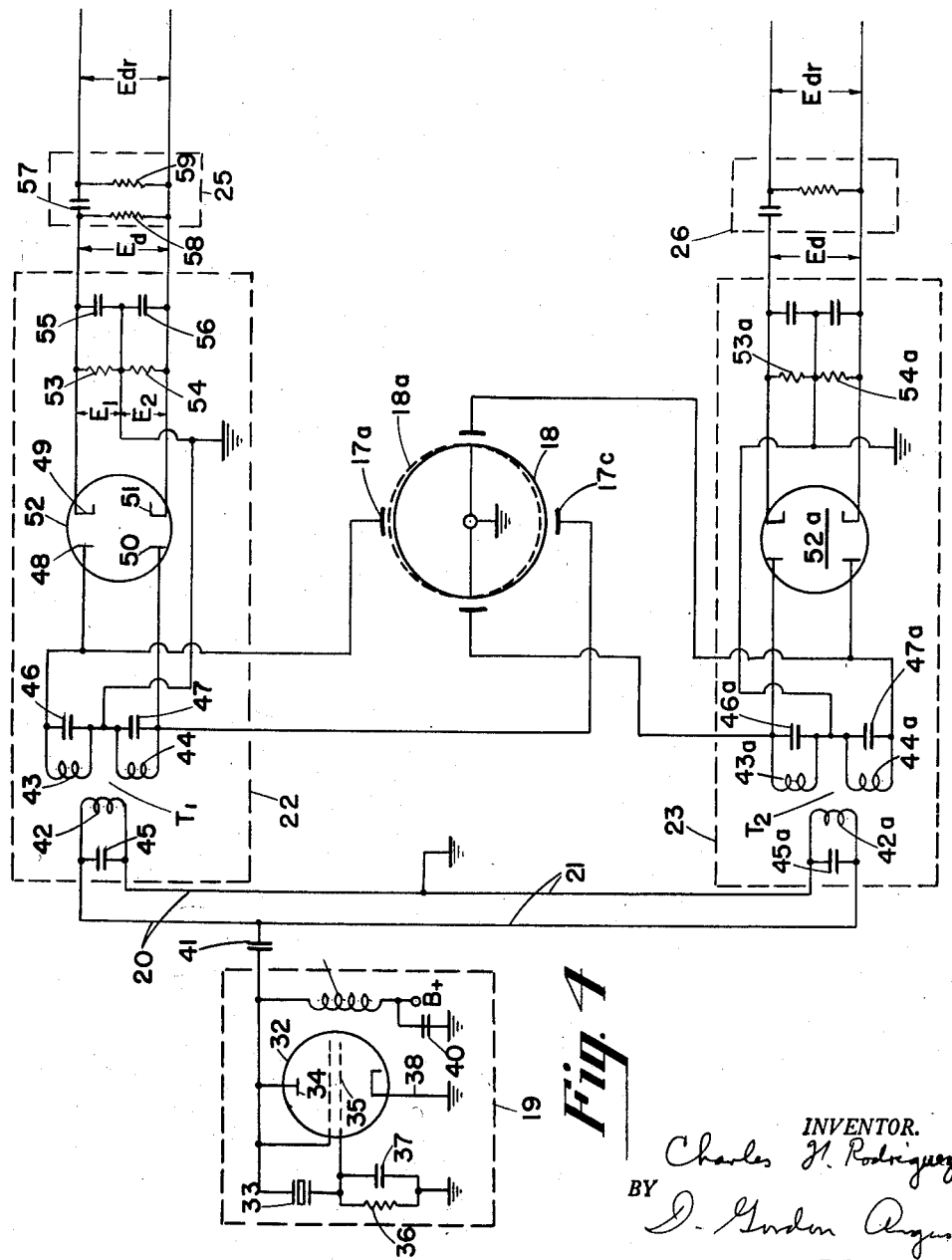

Referring to the drawings, there is shown a craft in the form of a missile 10, which may for example be an airplane or guided missile or the like, which is to be directed in a desired direction relative to a target; ordinarily toward the target. For enabling it to be steered in the desired direction, it is shown with the usual rudder 11 and elevators 12. As these devices are well known and the particular form is no part of this invention, they are not shown in detail.

For the purpose of directing the missile 10 in a given direction relative to a target 13, there is provided a seeking device 14 which in this application is shown as a gyroscope having its rotor mounted for rotation on a universal 16 so that the gyro is free to turn in any direction. In Fig. 1, the gyro is shown with its axis of rotation 15 aligned with the axis of travel A of the missile. Since the gyro is mounted on the universal, it will be free to change its direction, as shown by dotted lines 14a, so that its axis of rotation could lie along a different line 15a, which intersects the axis A of the missile at the universal 16. A gyro such as the gyro 14 is disclosed in the said copending application Serial No. 180,610, filed August 21, 1950, and as explained in that specification, mechanism is provided (not shown in the present application) for causing the gyro axis 15 to move on the universal in accordance with the position of the target 13, so that the gyro axis will always tend to point toward the target. The particular means and mechanism for causing the gyro to shift or precess, in response to movement of the target relative to the missile 10 is the subject of said copending application and need not be described here. Various means and mechanisms have heretofore been proposed for causing a seeker such as the gyro 14 to aim itself automatically toward a target, and it will be understood that the showing of a gyro as a seeker or pointer in the present case is by way of illustration rather than of limitation; and any device which is caused to point in any particular direction with reference to a target may suit the purpose of the present invention.

In accordance with the present invention, there are related to an electrical conducting surface of the gyro rotor, four conducting plates 17a, 17b, 17c and 17d; and these four plates are mounted so that when the gyro axis 15 is collinear with the axis A of the missile, the electrical capacity between each of the plates and the metallic surface 18 of the rotor, is equal. For doing this, the plates may conveniently all be made of the same size and shape and spaced at equal angular distances from each other, that is, ninety angular degrees apart, and the same distance from surface 18 when the axis 15 coincides with the axis A.

When, however, the axis is precessed by action of the seeker mechanism so that the axis 15 no longer coincides with axis A, the position of surface 18 relative to the plates 17a, 17b, 17c and 17d changes. Thus, in precessing to the condition of axis 15a, the surface may change to a position 18a. Or again, a different directional shift throughout the possible 360° range may move the surface 18 to another position 18b. It will be understood that the surface 18a need not move exactly toward or away from any particular pair of plates but may move in any angular direction throughout the possible 360°.

In accordance with the present invention, this movement or precession of the pointer or gyro 14 is utilized in an electrical system involving frequency discriminators, wherein the output of the discriminators depends upon the precession and its direction. Such a system is shown in line and block diagram form in Fig. 3 wherein the grounded gyro surface 18 and its associated condenser plates 17a, 17b, 17c and 17d are shown connected into the system. The system comprises an oscillator 19 preferably of the high frequency type having an oscillator frequency, for example, of about 5 or 6 megacycles per second. The oscillator output is impressed through respective lines 20 and 21 on a pair of frequency discriminators 22 and 23 respectively. Although the electrical paths in this diagram are shown in single line form, it will be understood that each path will, in practice, have the usual return conductor. One of the frequency discriminators 22 is responsive to up-down deviations of the pointer or gyro and the other frequency discriminator 23 is responsive to left-right deviations of the pointer or gyro. The condenser plates 17a and 17c, for the up-down deviation, are carried over respective lines 24a and 24c to respective frequency discriminating circuits in the up-down discriminator 22; and the condenser plates 17b and 17d are carried over respective lines 24b and 24c to respective frequency discriminating circuits in the left-right discriminator 23. The output from each discriminator is impressed on a respective rate differentiator 25 and 26 respectively. The output from each rate differentiator will be voltages which can then be utilized in any desired manner to operate the steering mechanism for the missile or plane. Ordinarily, these voltages will be amplified in respective amplifiers 27 and 28, before utilizing.

The particular utilization devices shown in Fig. 3 are servo motors for operating aircraft or missile deflection vanes, the servomotor 29 serving to operate the up-down elevators and the servomotor 30 serving to operate the left-right rudder or deflector. Such servomotor systems for operating elevators, vanes and deflectors of aircraft are well known and need not be described in any detail here.

Fig. 3a shows a possible modification which may be substituted for the corresponding arrangement of Fig. 3. In Fig. 3a, inductance coils 60a, 60b, 60c and 60d are used in place of the respective condenser plates 17a, 17b, 17c and 17d. One side of each coil is connected together and grounded and the remaining side of each coil is connected with the leads 24a, 24b, 24c and 24d of Fig. 3, so that these inductances are connected in the same discriminator circuits as the corresponding capacitances of Fig. 3 were connected. The coils are spaced ninety angular degrees apart in a manner similar to the four condenser plates of Fig. 3, and are similarly related to the surface 18 of the gyro. The surface 18, instead of forming capacitance as in Fig. 3, will affect the inductance of the four coils. Thus, when the gyro is on its proper reference axis, the spacing of surface 18 from the coils or their cores, can be arranged to be equal; and under this condition, it can be provided that there be no output voltage from the discriminators. If, however, the gyro precesses, the space relationships will change, bringing the surface 18 closer to one or more coils and further from the remaining coils. Surface 18 can be an electrical conducting material so that changes of its proximity to the respective coils will change the inductance of the coils somewhat. This change of inductance can be produced, for example, by the inducing of eddy currents in the metal of surface 18 in a well known manner which need not be discussed here in detail.

Fig. 4 shows in some detail a circuit arrangement in accordance with the block diagram of Fig. 3. Although Fig. 4 shows particularly the capacitance arrangement of the plates 17a, 17b, 17c and 17d in relation to surface 18, as in Fig. 3, it should be understood that the alternative inductance arrangement of Fig. 3a could be substituted, if desired. In Fig. 4, the oscillator comprises a tetrode tube 32 having its screen and anode tied together and a frequency controlling crystal 33 connected between the anode 34 and the control grid 35. A grid leak resistor 36 with a condenser 37 in parallel therewith is connected between the control grid and the cathode 38 which is grounded. The B voltage is carried to the anode through the usual radio frequency choke 39 provided with a high frequency by-passing condenser 40. The oscillator output is carried through a coupling condenser 41 to the inputs of both discriminators 22 and 23, over lines 20 and 21. Each of these discriminators is shown as being of a conventional type, each having a transformer $T_1$ and $T_2$, respectively, with respective primary coils 42 and 42a and each of the primary coils having coupled to it a pair of secondary coils 43, 44 and 43a, 44a, respectively. Condensers 45 and 45a tune the respective primary coils to the oscillator frequency, and the secondary coils are tuned by the respective condensers 46, 47 and 46a, 47a. A rectifier is connected in series with the output from each secondary coil; these rectifiers being the diodes formed by anode 48 and cathode 49, and by anode 50 and cathode 51, in vacuum tube 52; and it will be understood that vacuum tube 52a is similarly constructed and connected. Each diode is connected with a load resistor, these being the resistors 53 and 54 of discriminator 22 and resistors 53a and 54a of discriminator 23.

Figure 5:
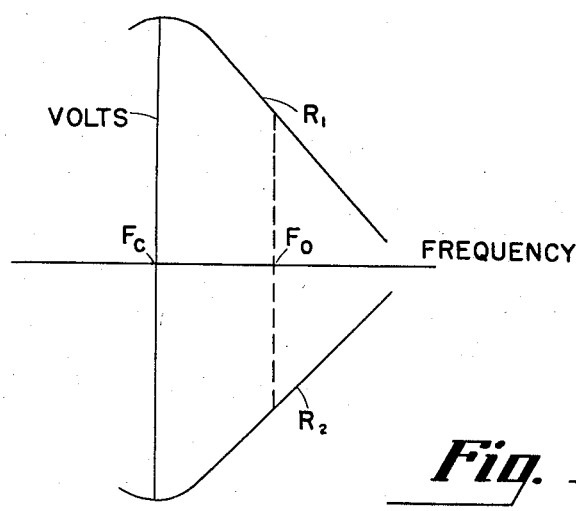
Fig. 5 is a graph of discriminator voltage vs. frequency in the system of Figs. 3 and 4.

Both of the secondaries of each discriminator are tuned to the same frequency, which may be either above or below the carrier frequency of the oscillator. In the present example, it is assumed that both secondaries are tuned above the carrier frequency. The relationship is shown in Fig. 5, which is a graph of voltage vs. frequency, of one of the discriminators. As the two discriminators will ordinarily be made identical, the graph of Fig. 5 will apply to each discriminator. Applying Fig. 5 to discriminator 22, the frequency $F_c$ is the oscillator carrier frequency and the frequency $F_o$ is the natural resonant frequency of the discriminator secondaries when the capacities due to plates 17a and 17c are equal, which will be the case when the axes of the missile or craft and also of the gyro are on target.

Now, if the gyro axis deviates from the missile axis so that the surface 18 moves to another position such as dotted line 18a, the capacity $C_1$ to plate 17a will be increased and the capacity $C_2$ to plate 17c will be correspondingly decreased. The increase of capacity $C_1$ at 17a will decrease the resonant frequency of secondary 43 so that it will approach the carrier frequency along the carrier resonance curve $R_1$ (Fig. 5); and conversely, the decrease of capacity $C_2$ at 17c will increase the resonant frequency of the other secondary 44 so that it will move further away from the carrier frequency $F_c$ along the carrier resonance curve $R_2$. The resonance curve $R_2$ is shown inverted with respect to the other resonance curve $R_1$ because of the fact that the voltages resulting from the two secondary coils 43 and 44 are opposite in direction. It is seen that the voltage across coil 43 will increase while the voltage across coil 44 will decrease.

Figures 5A, 6:
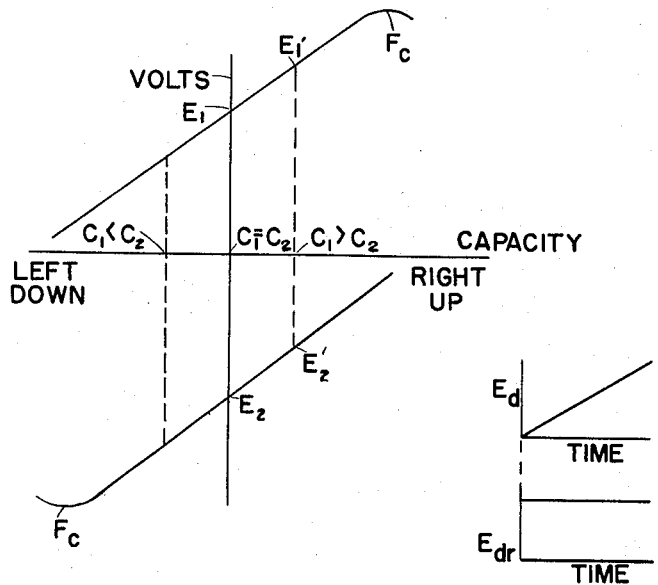
Fig. 5a is a graph of discriminator output voltage vs. seeker deviation following from the relationship of Fig. 5.
Fig. 6 is a graph showing voltage relationships at the output of the discriminator and the differentiator in the system of Figs. 3 and 4.

This change of voltage is shown in Fig. 5a which is a graph of voltage vs. capacity consequent upon the seeker deviation. At point O, the capacity $C_1$ is equal to the capacity $C_2$, and the voltage $E_1$ is equal to the voltage $E_2$. Since voltages $E_1$ and $E_2$ are opposite to each other, there is no resultant voltage $E_d$ at the discriminator output. Now when the gyro moved to the position 18a (Fig. 4) so that capacity $C_1$ became greater than capacity $C_2$, the voltage $E_1$ increased to a greater voltage $E_1'$, while the voltage $E_2$ decreased to a lesser voltage $E_2'$. This produces a resultant voltage $E_d$ across the discriminator which is the difference between voltages $E_1'$ and $E_2'$.

Thus, there will appear a resultant D. C. voltage $E_d$ at the discriminator output whenever the pointer or gyro deviates in an up-and-down direction. There will similarly be a resultant voltage $E_d'$ whenever the gyro precesses in the left and right direction; and the magnitude and sign of these voltages $E_d$ and $E_d'$ will depend on the angle of deviation in the respective direction. In the usual case, the angle of deviation will not be exactly horizontal or exactly vertical, but will lie at some intermediate angle throughout the 360° range in which the gyro can precess, so that there will be both a vertical and horizontal component of deviation. In such case, the voltage $E_d$ and its sign will indicate the magnitude and direction of the up-down precession and the magnitude and sign of the voltage $E_d'$ will be an indication of the left-right deviation and its direction.

For the purpose of making the craft respond to the deviation of the pointer or gyro, it is desired that there be provided voltages which are proportional to the rate of change of the gyro deviation angle rather than to the magnitude of the angle. The reason for this is that it is known that the craft can be more accurately brought on to its course and maintained there if its up-down and left-right steering means are operated in accordance with rate of change of direction rather than to the absolute magnitude of direction. Such a desired rate of change voltage can be provided by impressing the outputs of the two discriminators on a rate differentiation circuit. Such circuits are well known in the art and need not be described in detail. They may be provided, for example, by a network of series capacity and shunt resistance. Thus, the differentiation circuit 25 at the output of discriminator 22 is shown composed of a series condenser 57 and shunt resistances 58 and 59 on each side thereof. By this arrangement, the output voltage from the differentiator $E_{dr}$ will be proportional to the rate of change of the voltage $E_d$. This is exemplified in Fig. 6 which shows a graph of these voltages on a time base. If it be assumed that the gyro is deviating in a given direction, for example, the up-down direction, at a uniform rate, the voltage representing the up-down deviation will increase uniformly with time, as shown by the straight oblique line in the graph. The slope of this line will then establish the voltage $E_{dr}$ at the output of the differentiator, which in this case will be uniform with time so long as the voltage $E_d$ is a straight line; and the magnitude of $E_{dr}$ will depend on the slope of $E_d$. Similarly, voltage $E_{dr}$ can be developed at the output of the other differentiator 26.

Thus, so long as the gyro continues to deviate in any direction, there will be a corresponding voltage at the output of the corresponding rate differentiator. This will be a D. C. voltage which will ordinarily be amplified to facilitate its use as an operating voltage for the servo or other mechanism used to operate the steering means. In the common situation, where there are voltages developed at both differentiators, there will be simultaneous steering in both the horizontal and vertical direction. Whenever the pointer or gyro stops deviating in any particular direction, there will then no longer be any output voltage in response thereto, and the steering mechanism will then be held in the corresponding position and maintained there until the gyro again deviates in the direction.

It will be recognized that by this invention there is provided a highly useful means for directing a craft, such as an aircraft or missile, toward a target such as a hostile enemy craft or missile. It should also be recognized however, that this invention is useful also in other situations. For example, it may be useful in avoiding collisions between two or more flying craft, rather than in creating an actual collision or homing of one craft toward another. In avoiding collisions, for example, the precession of the pointer or gyro means may be used to turn the rudders or steering means of the craft in a direction other than that toward the target; and in such safety applications, the system may be useful on other vehicles than aircraft; for example, it may find use in marine craft or automotive vehicles on the ground.

It will be recognized further, that the invention is not limited to the specific embodiment shown and described, which is given by way of illustration rather than of limitation. Modifications of details and features may readily suggest themselves to those skilled in the art, without departure from the scope of the invention which is not limited except in accordance with the appended claims.

For example, the particular capacitance or inductance pickup arrangements connected into the discriminator circuits could be modified as desired, and are not limited to the particular forms of capacitance or inductance which are shown. Any form of reactance pickup arrangement having the quadrature relationship around a surface, or surface of revolution, on a gyro or deflectable pointer could be used. Furthermore, the pickup inductance or capacitance elements need not be arranged exactly in vertical or horizontal relationships as shown herein, but could be turned at any angle relative to the horizon or horizontal, as long as the quadrature relationship is provided.

I claim:

1. A system responsive to the precession of a gyro rotor which is adapted to be precessed in any angular direction, said system comprising a carrier frequency oscillator, a pair of frequency discriminators having impressed thereon the voltage from the oscillator, each discriminator comprising a pair of frequency discriminating circuits containing inductance and capacity, said gyro rotor having a conducting surface of revolution which rotates with the gyro rotor and precesses with it, four condenser plates fixed at equal angular distances from each other and capacitatively related with the surface of revolution to form a capacitance with said surface, each capacitance being connected in a respective one of the frequency discriminating circuits, and each frequency discriminator being adjusted for zero output voltage when the gyro rotor is aligned on a reference axis, whereby precession of the gyro rotor correspondingly changes the four capacitances and produces resultant output voltage at the discriminators.

2. A system responsive to the precession of a gyro rotor which is adapted to be precessed in any angular direction, said system comprising a carrier frequency oscillator, a pair of frequency discriminators having impressed thereon the voltage from the oscillator, each discriminator comprising a pair of frequency discriminating circuits containing inductance and capacity, four reactance elements, means connected with said gyro rotor for varying the reactance of said elements in accordance with precession of the gyro rotor, said elements being located at equal angular distances apart with relation to said varying means, each element being connected in a respective one of the frequency discriminating circuits, and each frequency discriminator being adjusted for zero output voltage when the gyro rotor is aligned on a reference axis, whereby precession of the gyro rotor correspondingly changes the values of the four reactances and produces resultant output voltage at the discriminators.

3. A system according to claim 2 in which rectifying means is connected to each discriminator output and a differentiator is connected at the output of each rectifier.

4. Apparatus according to claim 3 in which a servo motor is connected to the output of each differentiator.

References Cited in the file of this patent

UNITED STATES PATENTS

| Number | Name | Date |
|---|---|---|
| Re. 23,066 | Moseley | Dec. 21, 1948 |
| 2,059,271 | Parker | Nov. 3, 1936 |
| 2,260,122 | Moore | Oct. 21, 1941 |
| 2,278,379 | Koster | Mar. 31, 1942 |
| 2,328,670 | Parker | Sept. 7, 1943 |
| 2,334,704 | Hilferty | Nov. 23, 1943 |
| 2,396,091 | De Bey | Mar. 5, 1946 |
| 2,414,103 | Hunter | Jan. 14, 1947 |
| 2,439,294 | Hammond | Apr. 6, 1948 |
| 2,462,081 | Esval | Feb. 22, 1949 |
| 2,463,119 | Pyle et al. | Mar. 1, 1949 |
| 2,463,687 | Gittens | Mar. 8, 1949 |
| 2,557,401 | Agins et al. | June 19, 1951 |
| 2,559,298 | Hayes | July 3, 1951 |
| 2,633,028 | Fillebrown | Mar. 31, 1953 |